US011693743B2

(12) United States Patent
Liu et al.

(10) Patent No.: US 11,693,743 B2
(45) Date of Patent: Jul. 4, 2023

(54) METHOD TO OPTIMIZE RESTORE BASED ON DATA PROTECTION WORKLOAD PREDICTION

(71) Applicant: EMC IP Holding Company LLC, Hopkinton, MA (US)

(72) Inventors: Bing Liu, Hopkinton, MA (US); George Mathew, Belmont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 160 days.

(21) Appl. No.: 16/993,096

(22) Filed: Aug. 13, 2020

(65) Prior Publication Data

US 2022/0050754 A1 Feb. 17, 2022

(51) Int. Cl.
G06F 11/14 (2006.01)
G06F 11/34 (2006.01)
G06N 20/20 (2019.01)
G06F 18/23213 (2023.01)

(52) U.S. Cl.
CPC ...... G06F 11/1466 (2013.01); G06F 11/1448 (2013.01); G06F 11/1464 (2013.01); G06F 11/1469 (2013.01); G06F 11/3433 (2013.01); G06F 18/23213 (2023.01); G06N 20/20 (2019.01)

(58) Field of Classification Search
None
See application file for complete search history.

(56) References Cited

U.S. PATENT DOCUMENTS

| 9,424,152 | B1 * | 8/2016 | Raut | G06F 11/2041 |
| 11,514,317 | B2 * | 11/2022 | Lakshmikantha | G06N 3/08 |
| 2007/0214384 | A1 * | 9/2007 | Kitamura | G06F 11/1469 |
| | | | | 714/E11.122 |
| 2010/0274983 | A1 * | 10/2010 | Murphy | G06F 11/1456 |
| | | | | 711/170 |
| 2014/0310246 | A1 * | 10/2014 | Vijayan | G06F 11/1464 |
| | | | | 707/679 |
| 2018/0232162 | A1 * | 8/2018 | Bode | G06F 11/1446 |
| 2018/0260466 | A1 * | 9/2018 | Jacoby | G06F 16/27 |
| 2018/0300206 | A1 * | 10/2018 | Dai | G06F 11/1458 |
| 2020/0410418 | A1 * | 12/2020 | Martynov | G06Q 10/06312 |

FOREIGN PATENT DOCUMENTS

CN 110716690 A * 1/2020

OTHER PUBLICATIONS

Giovanni De Micheli. Synthesis and Optimization of Digital Circuits. 1994. McGraw-Hill. pp. 3-6.*

* cited by examiner

Primary Examiner — Nathan Sadler
(74) Attorney, Agent, or Firm — Womble Bond Dickinson (US) LLP (57) ABSTRACT

An intelligent method of selecting a data recovery site upon receiving a data recovery request. The backup system collects historical activity data of the storage system to identify work load of every data recovery site. A predicted activity load for each data recovery site is then generated using the collected data. When a request for data recovery is received, the system first identifies which data recovery site has copies of the files to be recovered. Then it uses the predicted work load for these data recovery sites to determine whether to use a geographically local site or a site that may be remote geographically, but has a lower work load.

20 Claims, 6 Drawing Sheets

METHOD TO OPTIMIZE RESTORE BASED ON DATA PROTECTION WORKLOAD PREDICTION

TECHNICAL FIELD

This disclosure relates to data protection, especially in system having multiple copies or replicas across different data protection sites.

BACKGROUND

Replication has recently been leveraged to generate multiple data copies across different data protection (DP) sites. Besides the improved data availability brought on by multiple replicas, it also bears consideration regarding how to optimize data restore with these replicas. Such considerations may be particularly relevant in situations when a user's preferred disaster recovery (DR) site is experiencing low performance, e.g., due to workload. Similarly, for mobile users, there may be no configured DR site or the geographically closest DR site may be experiencing low performance when restore is needed. Current systems do not provide a solution of how to choose the best fit DR site (which has the copy needed) to accelerate a restore operation with minimum impact on normal backup operations.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Aspects of this disclosure include methodologies to intelligently selecting data protection site to perform restore operation. According to disclosed aspects, an analytic engine collects workload history data on each DP node and predicts both IO and CPU load for the next N days based on the collected data. System management controllers (may be across Federation sites) share these prediction results with each other. Upon receiving a restore request, a management controller lookups which DP sites own the needed data copies and checks which one of them will be least busy in the future according to the prediction. Then it redirects the customers' restore request to the idlest DP site.

According to disclosed embodiments, backup and restore operations are considered from a global point of view. Many organizations now deploy multiple data protection sites and own multiple copies of the same data across the different sites (often at different geographical locations). Such an approach opens the option to restore data from other DP sites rather than the user configured (or preferred) DP site.

Most of time, organizations have their configured (or preferred) Data Restore (DR) site, which is normally at the geographical location that is closest to their business application. But in some cases, this configured DR site may experience low performance, e.g., due to heavy incoming ingest streams, heavy Instant Access/Restore storming, or even unclear hardware performance issue. If the system restores data from this busy DP site, it will degrade both normal backup operations and the organization's restore streams, potentially breaking the service level agreement (SLA). Disclosed embodiments provide mechanism to intelligently redirect the restore request to another site which is less busy.

According to other aspects, intelligent restore operation for mobile users is implemented. For the most part, mobile users do not select preferred restore site, but rather the system naturally selects the closest geographical location. A geographical proximal location may be preferred, but is not guaranteed to be the optimal site. Therefore, disclosed embodiments select the optimal site to use for the restore operation, even if it's the geographically remote site.

The subject inventors have observed that backup systems' workload peak time window vary periodically. For example, some organizations only schedule full backups during the weekend, which causes the CPU/IO resources to be much busier on the weekends than during working days. Using such information of past workload times, the workload busy status for next N days can be predicted. Hence, with machine learning techniques, the load prediction model can be trained based on the historical data. An analytic engine can collect each site's backup system's runtime CPU/IO statistic to predict workload status for the next N days. At the same time, the backup management center can exchange local and remote DP sites' workload results.

Figure 1:
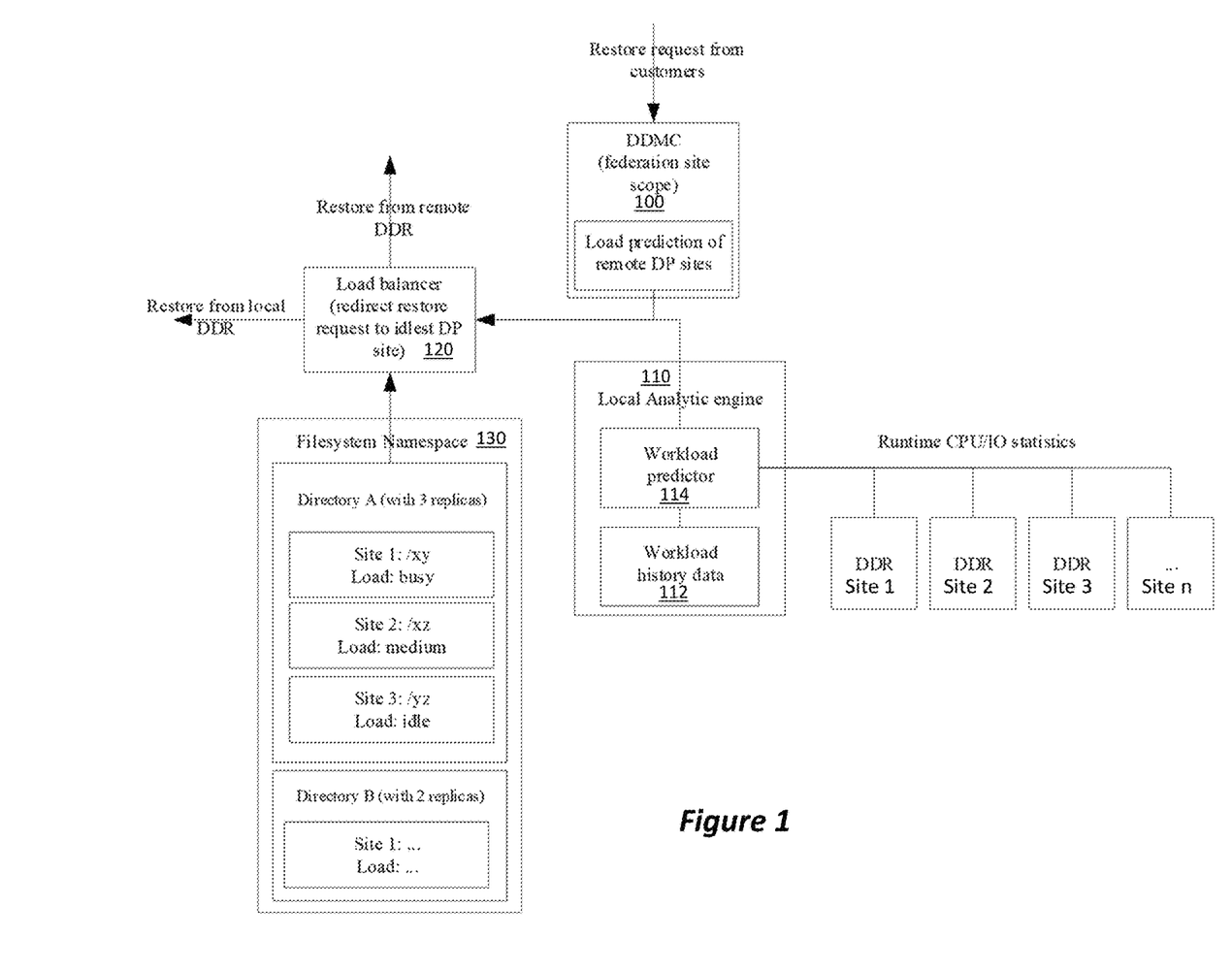
FIG. 1 is a schematic illustrating an example backup system according to one or more embodiments of the disclosure.

FIG. 1 is a general schematic illustrating a computing environment implementing embodiments disclosed herein. FIG. 1 illustrates a plurality of backup sites, indicated as site 1 to site n, wherein in this example each site is implemented as a Data Domain Replicator (DDR), available from Dell EMC of Round Rock, Tex. The runtime CPU/IO statistics are reported to a local analytic engine 110. The local analytics engine includes a storage 112 that maintains workload historical data and a predictor 114 that uses the historical data stored in storage 112 to derive predictions for the workload of any of the backup sites for a given future period of time.

In the disclosed example of FIG. 1, whenever a backup or replication is performed, the filesystem namespace 130 is updated, such that the directories store addresses for each of the files at each of the sites. Additionally, for each of the sites an indicator is included that indicates the predicted workload of the site in the near future. In a disclosed embodiment the workload is quantized into several levels of workloads. For example, the workload may be quantized as three levels: busy, average, and idle.

The replication workflow may proceed as follows. Based on the normal replication (Mtree/directory/MFR) logic, the process needs to update the file system namespace's corresponding meta data when the replication task finishes. In the namespace, the entry of directory or file needs to add information of the backup site which stores its replication. This information include the backup sites' IP address, corresponding directory (file) path and workload prediction result (in this example shown as busy, idle, or medium). The newly added entry of one directory may look like: (local:/backup/office_A, busy), (DP_server_1:/backup/xy, medium), (DP_server_2:/backup/yz, idle), etc. The backup site's busy status can be updated when backup manager 100 receives other sites' workload prediction results. Thus, in this particular example, it may be preferable to restore the files from the DP_server_2 site, which will be idle in near future.

The backup manager 100, (in this example, a Data Domain Management Center—DDMC), disseminates the information regarding the load prediction among the various local analytical engines. When a restore request is received at the backup manager 100, it forwards the request together with the load prediction to load balancer 120. Load balancer 120 determines which sites have replicas of the files needed for the requested restore operation. Based on the list of sites and the load prediction for the relevant sites, the load balancer forwards the restore request either to a local site or to a remote site that is less busy.

In general, the restore load balance between sites having the replicas may proceed as follows. When the load balancer 120 receives the files restore request from a user, it firstly lookups the entry in the namespace. If the file does not have a replica in other DP sites yet, it can only restore it from the local backup site. Under such circumstances the load balancer issues the restore request to the local site. Conversely, if it has multiple replicas across different DP sites, it checks the corresponding DP site' busy status and then decides whether the restore should be started from the local DP site or the idlest remote DP site that has the replicas. If the idlest remote DP site is chosen, then the backup management center 100 will redirect the restore request to the remote site for execution.

In disclosed embodiments, the system periodically monitors the load (for example, read/write/replication/streams_usage/CPU/IO) on every backup or replication set. The load data is maintained so as to provide a node level load on every replication site. Since backup jobs are mostly periodic, it is possible to predict future load caused by backup operations. The system also tracks replicas of each file globally. The load balancer can redirect each restore request to the appropriate site so as to provide improved service while balancing the load over the replication sites.

Figure 2:
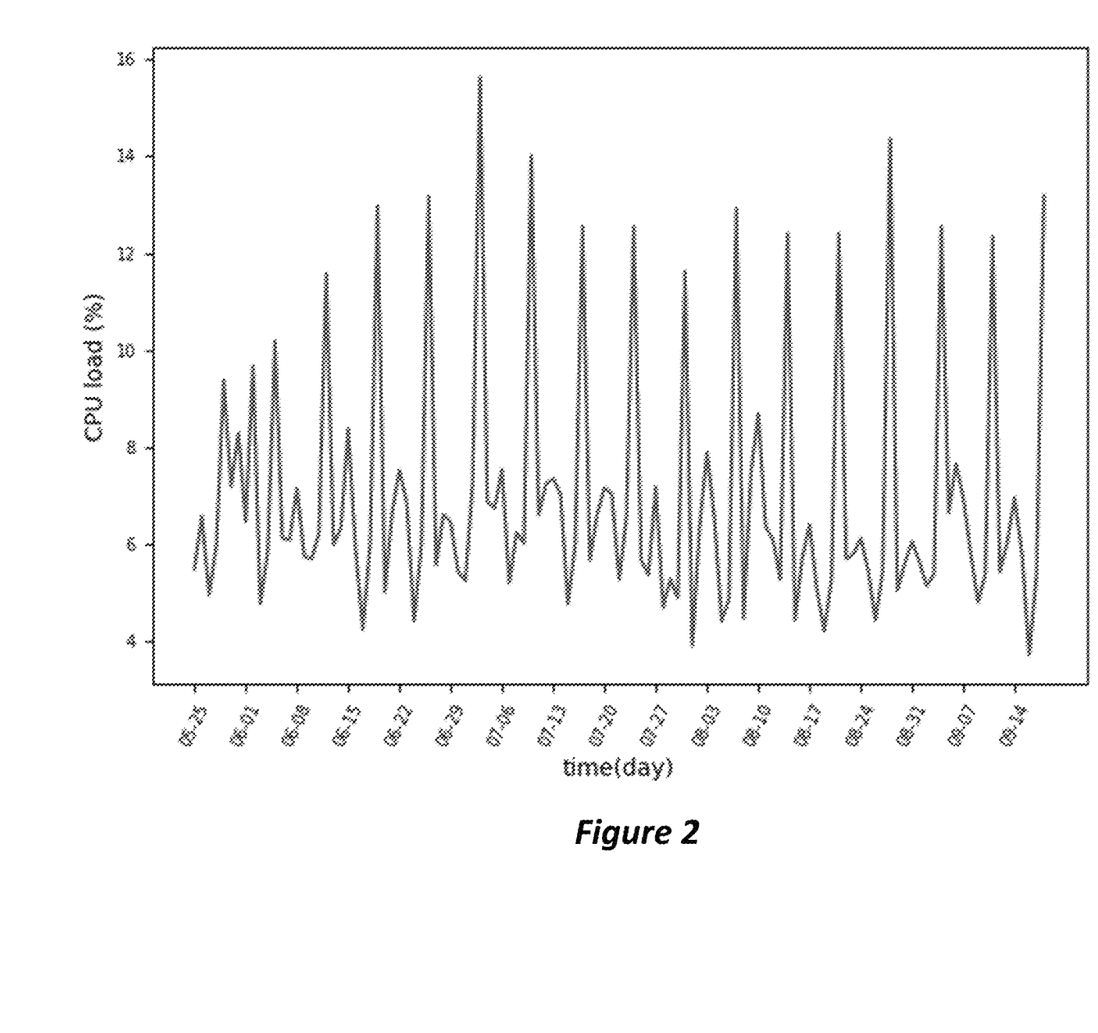
FIG. 2 is a plot illustrating sample data obtained according to one or more embodiments of the disclosure.

FIG. 2 is a plot of CPU load data obtained by the inventors from one site for a period of several weeks. As can be seen, the CPU load follows a periodical cycle, making it possible to predict future high load times. Machine learning can be used to generate the prediction. In one embodiment, the K-means method was used, which resulted in a period of about seven days.

In disclosed embodiment machine learning (ML) was used to train and do the prediction. The ML algorithm applied was Random Forest Regression version. It splits the total data set into training set and test testing set with ratio of 7:3. ML features include average CPU utilization per day during the past N days (N=7 in this example, since variation period was found to be around one week). ML regression label is the average utilization of CPU next day (here, it indicates the $8^{th}$ day's load).

Figure 3:
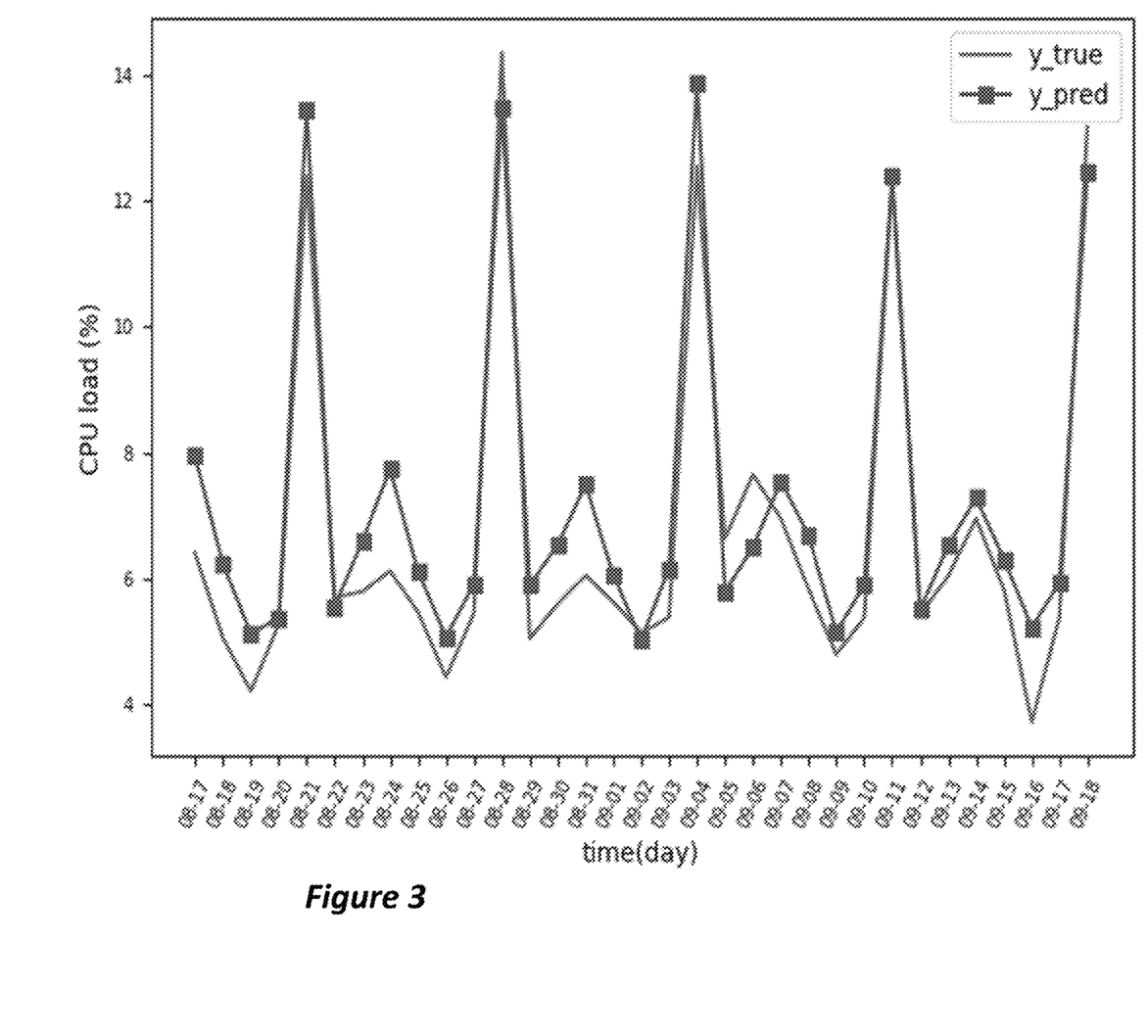
FIG. 3 is a plot illustrating predicated and actual data obtained according to one or more embodiments of the disclosure.

FIG. 3 shows the CPU load prediction result in blocked line and the true data in solid line. Overall, the predicted load shows a good result (small gap between the predicted and true data) and even in the worst case it can predict a correct change trend (for example, it can indicate whether the load will become higher or lower than today).

The $R^2$ score that is widely used in the ML evaluation was also computed. R-squared score is a statistical measure of how close the data are to the fitted regression line. It is also known as the coefficient of determination, or the coefficient of multiple determination for multiple regression. The $R^2$ score for the example illustrated was calculated to be 0.903, which also shows that the prediction works well.

Figure 4:
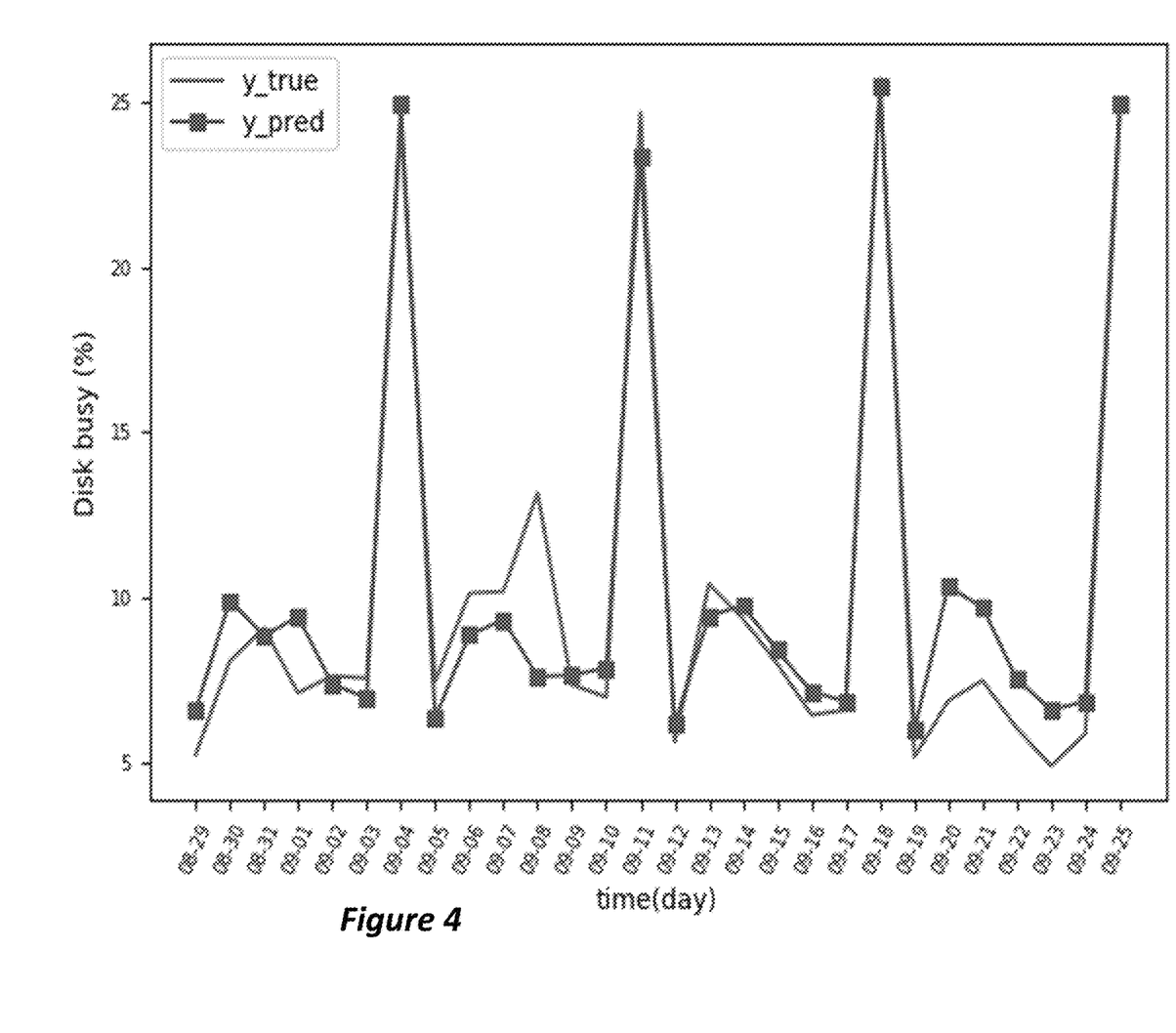
FIG. 4 is a plot illustrating predicated and actual data obtained according to one or more embodiments of the disclosure.

A similar experiment was conducted for several groups of hard disks, each group generally consisting of about 14 disks. Machine learning was used to train and do the prediction for the usage of the disk groups. The ML algorithm applied was again the Random Forest Regression version. It splits the total data set into training set and test testing set with ratio of 7:3. The ML features include average IO utilization per day during the past N days (N=7 was again used in this case, since the variation period was around one week). The ML regression label is the average utilization of IO next day (here, it indicates the 8rd day's load). FIG. 4 shows the average IO load prediction of all disk groups one day ahead (blocked line) as compared to actual results, (solid line). The IO load prediction's $R^2$ score is 0.932, which also shows a satisfying result.

Figure 5:
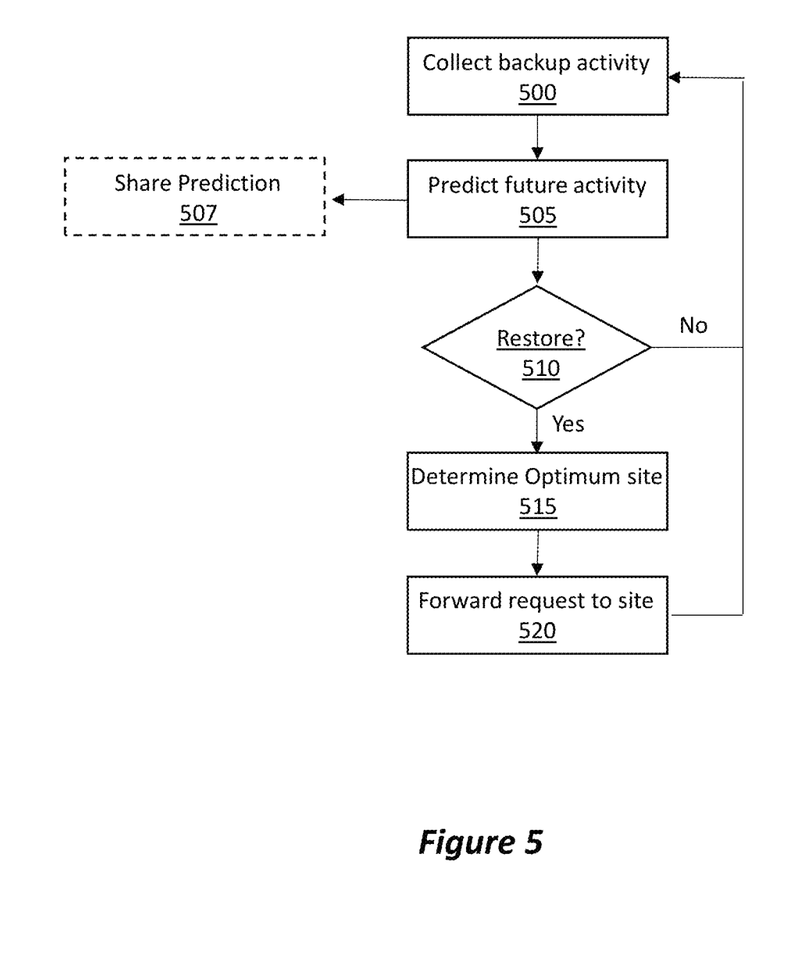
FIG. 5 is a flow chart illustrating a process according to an embodiment for a method for optimizing a restore operation.

FIG. 5 is a flow chart illustrating a process according to an embodiment for a method for optimizing a restore operation. The method may be implemented in a backup system having a backup manager and a plurality of data recovery (DR) sites, each DR site storing backup files. The method implements an efficient method of directing restore requests. In step 500 the system proceeds to collect backup activity data of each site for a period of time, e.g., one week. Using the activity data, at 505 the system generates a prediction of future activity load for each DR site. The prediction may also be set for a set period of time, e.g., for the next x days. At 510 it is checked whether a restore request has been received. If not, the cycle of collecting data and generating predictions continues. Also, if implemented, at 507 the method proceeds to share the prediction results with other DR sites. At 510 when a restore request is received, the method proceeds to step 515 to determine the optimal site for executing the recovery, based on the predicted future activity of each relevant DR site i.e., among the sites having the needed files. Then at 520 the method proceeds to forward the restore request to the site having the low activity load, according to the prediction.

Figure 6:
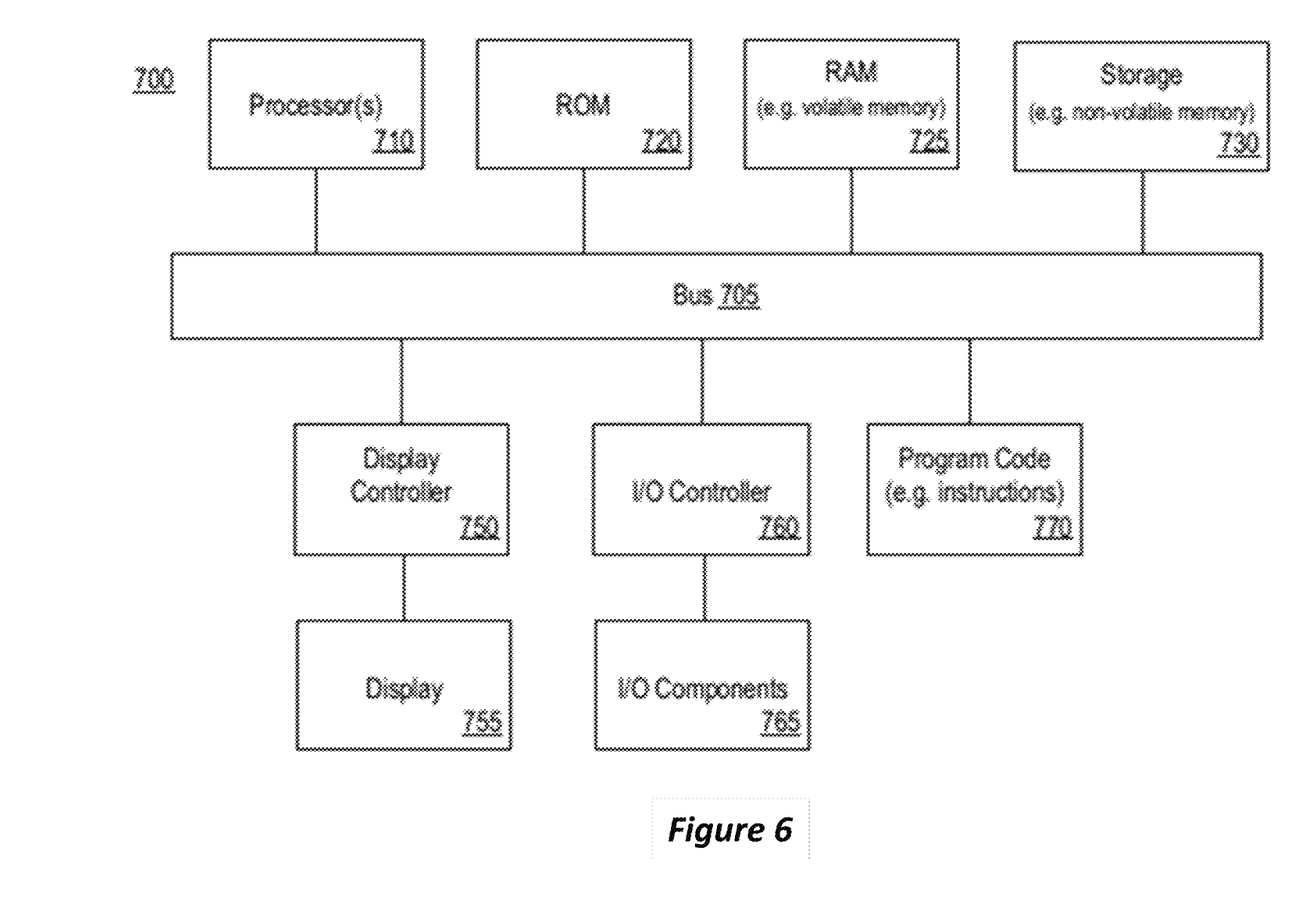
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 700 (or system, or server, or computing device, or device) may represent any of the devices or systems described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein. Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. In a backup system comprising a backup manager and a plurality of data recovery (DR) sites, each DR site storing backup files, a method of directing restore requests, the method comprising:

collecting backup activity data of each site for a period of time including read, write, replication, stream, and usage of CPU and I/O load on every replication set from each of the DR sites to generate a prediction of future activity load for each DR site by using K-means method and a machine learning (ML) by splitting a total data set into a test training set and a test testing set with a ratio of 7:3;

generating the prediction of future activity load for each DR site by using the activity data to predict future activity load for each site, wherein the prediction is to predict workload status for each site for a set period time;

receiving a restore request;

determining which of the sites stores required backup files by using the future activity load based on the prediction to determine which of the sites has low activity load when no preferred DR site is selected by a user; and forwarding the restore request to the site having the low activity load.

2. The method of claim 1, wherein collecting backup activity data comprises collecting I/O and CPU activity.

3. The method of claim 1, further comprising quantizing the future activity load into N activity levels.

4. The method of claim 3, wherein the N activity levels include three levels: busy, average, and idle.

5. The method of claim 1, further comprising storing in a file system each address of each replica of each file with a corresponding indication of predicted activity load level for the site corresponding to the address.

6. The method of claim 1, further comprising upon receiving a restore request:

designating one of the sites as local site;

determining whether additional sites store replicas of files stored in the local site; and when it is determined that no other site stores a replica, forwarding the request to the local site.

7. The method of claim 6, further comprising:

when it is determined that other site stores a replica, determining whether the other site's predicted activity level is lower than predicted activity level of the local site and, if so, forwarding the request to the other site.

8. The method of claim 1, wherein collecting backup activity data is performed periodically and is used to predict future activity load.

9. A system comprising:

a plurality of storage systems distributed in a plurality of data recovery (DR) sites;

an analytical engine;

a backup manager;

a load balancer;

wherein the analytical engine, backup manager, and load balancer employ one or more processors; and a non-transitory computer readable medium storing a plurality of instructions, which when executed, cause the one or more processors to perform the steps:

collect backup activity data of each of the DR sites for a period of time including read, write, replication, stream, and usage of CPU and I/O load on every replication set from each of the DR sites to generate a prediction of future activity load for each DR site by using K-means method and a machine learning (ML) by splitting a total data set into a test training set and a test testing set with a ratio of 7:3;

generate the prediction of future activity load for each DR site by using the activity data to predict future activity load for each of the DR sites, wherein the prediction is to predict workload status for each site for a set period time;

upon receiving a restore request, determine which of the DR sites stores required backup files by using the future activity load based on the prediction to determine which of the sites has low activity load when no preferred DR site is selected by a user; and forward the restore request to the DR site having the low activity load.

10. The system of claim 9, wherein the collect backup activity data step is performed periodically and is used to update the predicted future activity load.

11. The system of claim 10, wherein the collect backup activity data step comprises collecting I/O and CPU activity from each of the DR site.

12. The system of claim 11, further comprising the step further comprising quantizing the future activity load into N activity levels.

13. The system of claim 12, wherein the N activity levels include three levels: busy, average, and idle.

14. The system of claim 11, further comprising the step of storing in a file system each address of each replica of each file with a corresponding indication of predicted activity load level for the site corresponding to the address.

15. The system of claim 14, further comprising the step, upon receiving a restore request:

designating one of the sites as local site;

determining whether additional sites store replicas of files stored in the local site; and when it is determined that no other site stores a replica, forwarding the request to the local site.

16. A computer program product comprising a non-transitory computer-readable medium having a computer-readable program code embodied therein to be executed by one or more processors, the program code operating in a computing cluster and including instructions to:

collect backup activity data of each of the DR sites for a period of time including read, write, replication, stream, and usage of CPU and I/O load on every replication set from each of the DR sites to generate a prediction of future activity load for each DR site by using K-means method and a machine learning (ML) by splitting a total data set into a test training set and a test testing set with a ratio of 7:3;

generate the prediction of future activity load for each DR site by using the activity data to predict future activity load for each of the DR sites, wherein the prediction is to predict workload status for each site for a set period time;

upon receiving a restore request, determine which of the DR sites stores required backup files by using the future activity load based on the prediction to determine which of the sites has low activity load when no preferred DR site is selected by a user; and forward the restore request to the DR site having the low activity load.

17. The computer program product of claim 16, wherein the program code includes further instructions to store in a file system each address of each replica of each file with a corresponding indication of predicted activity load level for the site corresponding to the address.

18. The computer program product of claim 17, wherein the program code includes further instructions to periodically collect the backup activity data and update the predicted future activity load.

19. The computer program product of claim 18, upon receiving a restore request:

designating one of the sites as local site;

determining whether additional sites store replicas of files stored in the local site; and when it is determined that no other site stores a replica, forwarding the request to the local site.

20. The computer program product of claim 19, wherein collecting backup activity data step comprises collecting I/O and CPU activity from each of the DR site.

* * * * *